United States Patent [19]

Drent et al.

[11] Patent Number: 5,369,075
[45] Date of Patent: Nov. 29, 1994

[54] POLYMERIZATION PROCESS

[75] Inventors: Eit Drent; Johannes J. Keijsper, both of Amsterdam, Netherlands

[73] Assignee: Shell Oil Company, Houston, Tex.

[21] Appl. No.: 35,848

[22] Filed: Mar. 23, 1993

Related U.S. Application Data

[63] Continuation of Ser. No. 833,201, Feb. 10, 1992, Pat. No. 5,245,123.

[30] Foreign Application Priority Data

Feb. 26, 1991 [NL] Netherlands ............... 9100341

[51] Int. Cl.$^5$ ............................................. B01J 31/00
[52] U.S. Cl. .................................. 502/167; 502/162; 502/168; 502/170
[58] Field of Search ............... 502/162, 167, 168, 170

[56] References Cited

U.S. PATENT DOCUMENTS

| 3,083,184 | 3/1963 | Loeb | 528/392 |
|---|---|---|---|
| 4,473,482 | 9/1984 | Serres et al. | 528/392 |
| 4,740,625 | 4/1988 | Drent | 528/392 X |
| 4,778,876 | 10/1988 | Doyle et al. | 528/392 |
| 4,843,144 | 6/1989 | Van Broekhoven et al. | 528/392 |
| 4,851,582 | 7/1989 | Drent | 502/167 X |
| 4,880,903 | 11/1989 | Van Broekhoven et al. | 528/392 |
| 4,965,341 | 10/1990 | Van Doorn et al. | 528/392 |
| 5,216,120 | 6/1993 | Drent et al. | 502/162 X |
| 5,227,464 | 7/1993 | Keijsper | 502/162 X |

FOREIGN PATENT DOCUMENTS

| 0245893 | 4/1987 | European Pat. Off. |
| 0246683 | 4/1987 | European Pat. Off. |

*Primary Examiner*—Helen M. S. Sneed
*Assistant Examiner*—E. D. Irzinski
*Attorney, Agent, or Firm*—James O. Okorafor

[57] ABSTRACT

Novel catalyst compositions, useful in the production of linear alternating polymers of carbon monoxide and at least one ethylenically unsaturated hydrocarbon, comprise a compound of palladium, a Lewis acid of the formula $MF_n$ wherein n is 3 or 5 and M is a Group III or V element which forms a binary fluoride, and a bidentate ligand of phosphorus, nitrogen or sulfur.

10 Claims, No Drawings

POLYMERIZATION PROCESS

This is a continuation of application Ser. No. 833,201, filed Feb. 10, 1992, and now U.S. Pat. No. 5,245,123.

FIELD OF THE INVENTION

This invention relates to a gas-phase process for the production of linear alternating polymers of carbon monoxide and at least one olefinically unsaturated hydrocarbon. The invention also relates to novel catalyst compositions employed in that process.

BACKGROUND OF THE INVENTION

The class of linear alternating polymers of carbon monoxide and at least one ethylenically unsaturated hydrocarbon is now well known in the art. These polymers, conventionally termed polyketones or polyketone polymers, are of the general repeating formula

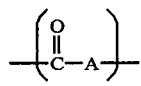  (I)

wherein A is a moiety derived from at least one ethylenically unsaturated hydrocarbon. The scope of the process of producing the polyketone polymers is extensive, but typically employs a catalyst composition formed from a compound of palladium, the anion of a strong non-hydrohalogenic acid and a bidentate ligand of phosphorus, nitrogen or sulfur. Van Broekhoven et al, U.S. Pat. No. 4,843,144 and U.S. Pat. No. 4,880,903, illustrate the use of bidentate ligands of phosphorus. Bidentate ligands of nitrogen are disclosed by U.S. Pat. No. 4,851,582 and bidentate ligands of sulfur are shown by U.S. Pat. No. 4,965,341.

It is also known that other acidic materials can be used instead of the anion of the strong non-hydrohalogenic acid. In U.S. Pat. No. 4,740,625 and U.S. Pat. No. 4,851,582 there are disclosed catalyst compositions produced from a palladium salt, a bidentate ligand of phosphorus or nitrogen, and a Lewis acid which is a halide of germanium or tin. This latter process, conducted in slurry (liquid) phase in the presence of liquid diluent, does not demonstrate a catalytic activity comparable to the use of catalyst compositions formed from, inter alia, the anion of strong non-hydrohalogenic acid.

It is also known that the polymerization can be conducted in a gaseous phase in the substantial absence of liquid reaction diluent, e.g., as in U.S. Pat. No. 4,778,876. The use of a gas phase process offers substantial advantages in the separation and recovery of the polymer product which does not require separation from the liquid diluent of a slurry- or liquid-phase process. It would be of advantage to provide additional gas-phase processes for the production of linear alternating polymers of carbon monoxide and at least one ethylenically unsaturated hydrocarbon, as well as catalyst compositions useful in that process.

SUMMARY OF THE INVENTION

The present invention provides a gas-phase process for the production of linear alternating polymers of carbon monoxide and at least one ethylenically unsaturated hydrocarbon. More particularly, the invention provides such a process conducted in the presence of a novel gas-phase catalyst composition formed form a palladium compound, a Lewis acid comprising a metal fluoride of defined structure and a bidentate ligand of phosphorus, nitrogen or sulfur.

DESCRIPTION OF THE INVENTION

The olefinically unsaturated hydrocarbons useful as precursors of the linear alternating polymers have up to 20 carbon atoms inclusive, preferably up to 10 carbon atoms inclusive. These unsaturated hydrocarbons are illustrated by aliphatic hydrocarbons including ethylene and other α-olefins such as propylene, 1-butene, isobutylene, 1-hexene, 1-octene and 1-dodecene, as well as by arylaliphatic hydrocarbons containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred linear alternating polymers are copolymers of carbon monoxide and ethylene or terpolymers of carbon monoxide, ethylene and a second ethylenically unsaturated hydrocarbon of at least three carbon atoms, particularly an α-olefin such as propylene.

Within the preferred terpolymers of the invention there will be at least about two units incorporating moieties derived from ethylene for each unit incorporating a moiety derived from the second ethylenically unsaturated hydrocarbon. Preferably, there will be from about 10 to about 100 units incorporating moieties derived from ethylene for each unit incorporating a moiety derived from the second ethylenically unsaturated hydrocarbon. The preferred polyketone polymers are therefore represented by the repeating formula

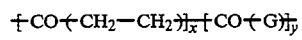  (II)

wherein G is a moiety derived from the second ethylenically unsaturated hydrocarbon of at least 3 carbon atoms polymerized through the ethylenic unsaturation thereof and the ratio of y:x is less than about 0.5. When the preferred copolymers of carbon monoxide and ethylene are produced by the process of the invention, there will be no second hydrocarbon present and the copolymers are represented by the above formula II wherein y is zero. When y is other than zero, i.e., terpolymers are produced, the —CO—(—CH$_2$—CH$_2$—) units and the —CO—(—G—)— units are found randomly throughout the polymer chain and the preferred ratios of y:x are from about 0.01 to about 0.1. The end groups or "caps" of the polymer chain will depend upon what materials were present during polymerization and whether and how the polymer was purified. The end groups do not, however, contribute to the properties of the polymer to any substantial extent so that the polymers are fairly represented by the formula for the polymeric chain as depicted above.

Of particular interest are the polyketone polymers of number average molecular weight from about 1,000 to about 200,000, especially those polymers of number average molecular weight from about 20,000 to about 90,000, as determined by gel permeation chromatography. The properties of such polymers will depend in part upon the molecular weight, whether the polymer is a copolymer or a terpolymer and, in the case of terpolymers, the nature of and the proportion of the second hydrocarbon present. Such polyketone polymers will typically have a melting point from about 175° C. to about 300° C., but more often from about 210° C. to about 275° C. The polymers have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced by contacting carbon monoxide and ethylenically unsaturated hydrocarbon in the gaseous phase in the substantial absence of reaction diluent under polymerization conditions in the presence of a catalyst composition formed from a compound of palladium, a Lewis acid of defined structure and a bidentate ligand of phosphorous, nitrogen or sulfur. The compound of palladium is preferably a palladium carboxylate and palladium acetate, palladium propionate, palladium butyrate and palladium hexanoate are satisfactory. Palladium acetate is particularly preferred.

The Lewis acid component of the catalyst composition is a fluoride of the formula $MF_n$ wherein n is 3 or 5 and M is an element of Group III or V of the Periodic Table of Elements which forms a binary fluoride. Illustrative of "M" elements are boron, antimony, phosphorus, aluminum, gallium, arsenic, tantatum, niobium and indium. Suitable Lewis acids of the $MF_n$ formula include boron trifluoride, antimony pentafluoride, phosphorus pentafluoride, aluminum trifluoride, gallium trifluoride, arsenic pentafluoride, tantatum pentafluoride and indium trifluoride. The use as a catalyst composition component of boron trifluoride or aluminum trifluoride is preferred. The Lewis acids are useful as such or are employed in the form of a complex with an oxygen-containing molecule, e.g., the etherate or alcoholate. When complexes are used as the source of the Lewis acid, a Lewis acid etherate is preferred, particularly a diethyl ether etherate although dibutyl ether etherates are also useful. Especially preferred as the Lewis acid is boron trifluoride diethyl ether etherate. The Lewis acid is provided to the catalyst composition in an amount about 0.5 mol to about 200 mols per mol of palladium compound. Particularly preferred are quantities of Lewis acid from about 1 mol to about 100 mols per mol of palladium.

The third component of the catalyst compositions of the invention is a bidentate ligand of phosphorus, nitrogen or sulfur. When a bidentate ligand of sulfur is used, the ligand is of the formula $$R-S-R'-S-R \quad (III)$$

wherein R independently is aliphatic or aromatic of up to 10 carbons inclusive and R' is a divalent hydrocarbyl linking group of up to 10 carbon atoms inclusive with from 2 to 4 carbon atoms inclusive in the bridge. R is suitably hydrocarbyl and groups such as methyl, butyl, hexyl, octyl, phenyl, tolyl or xylyl are useful or R is substituted hydrocarbyl containing atoms other than carbon and hydrogen, e.g., 2-chloroethyl, 7-bromoheptyl and 4-methoxyphenyl. R' is suitably 1,2-ethylene, 1,3-propylene, 1,3-butylene, 2,2-dimethyl-1,3-propylene or 2,2,3,3-tetramethyl-1,4-butylene. In the case of bidentate ligands of sulfur, R is preferably hydrocarbyl and R' is preferably 1,2-ethylene. The sulfur-containing ligands 1,2-di(ethylthio)ethane, 1,2-di(benzylthio)ethane and 1,2-di(phenylthio)ethane are preferred.

When a bidentate ligand of nitrogen is employed, the ligand is of the structure

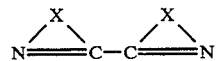

(IV)

wherein X individually is a divalent linking group of up to 10 carbon atoms with from 3 to 4 atoms in the bridge, at least two of which are carbon atoms. Illustrative of suitable bidentate ligands of nitrogen are 2,2'-bipyridine and 1,10-phenanthroline.

The bidentate ligands of phosphorus which are suitable for the catalyst compositions are represented by the formula

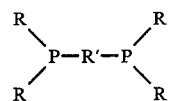

(V)

wherein R and R' have the previously stated meanings. In the case of such phosphorus-containing ligands, R is preferably aromatic containing at least one non-hydrocarbon polar group as a substituent of a ring carbon atom ortho to the ring carbon atom through which the R group is connected to the phosphorus. The preferred polar substituents are alkoxy and particularly preferred R groups include 2-methoxyphenyl, 2-ethoxyphenyl, 2,4-dipropoxyphenyl and 2,4,6-trimethoxyphenyl. The group 2-methoxyphenyl is especially preferred as the R group. The preferred R' group for phosphorus bidentate ligands is 1,3-propylene and preferred bidentate phosphorus ligands are 1,3-bis(diphenylphosphino)propane.

In the modifications of the catalyst composition wherein bidentate ligands of sulfur or nitrogen are employed, the ligand is provided in a quantity from about 0.5 mol to about 100 mols per mol of palladium, but preferably in a quantity from about 1 mol to about 50 mols per mol of palladium. The use of a bidentate ligand of phosphorus is preferred and such phosphorus ligand is used in a quantity from about 0.5 mol to about 2 mols per mol of palladium. Quantities of bidentate phosphorus ligand from about 0.75 mol to about 1.5 mol per mol of palladium are preferred.

It is useful on occasion to additionally provide to the catalyst composition an organic oxidizing agent in order to enhance the activity of the catalyst. Illustrative of useful oxidizing agents are aliphatic nitrites, aromatic nitro compounds and hydroquinones, both 1,4-hydroquinones and 1,2-hydroquinones. Preferred as the organic oxidizing agent are nitrobenzene and 1,4-hydroquinones such as 1,4-benzoquinone and 1,4-naphthoquinone. As stated, the presence of organic oxidizing agent is not required but amounts up to about 5000 mols per mol of palladium are satisfactory. When oxidizing agent is present, amounts from about 5 mols to about 5000 mols per mol of palladium are preferred.

The catalyst composition is formed by mixing the components thereof. It is sometimes useful to use a small amount of diluent to facilitate the mixing of components. Lower alkanols such as methanol and ethanol are suitable for this purpose. If diluent is utilized, however, it is typically removed as by evaporation once the catalyst composition is formed. The catalyst composition of the polymerization process of the invention is employed as a supported or unsupported catalyst. In one embodiment, the catalyst composition is added directly to the reactor in which polymerization is to be conducted as a particulate material or by spraying the catalyst composition into the reactor prior to removal of diluent used in the formation of the catalyst composition. In an alternate and generally preferred embodiment, the catalyst is formed by impregnating a solid porous carrier with a solution or slurry of catalyst composition followed by removal of any diluent or solvent. A wide variety of catalyst supports are useful including inorganic supports such as silica, alumina and talc as well as organic supports such as charcoal, cellulose and dextrose and polymers such as polyethylene, polypropylene or polystyrene. A preferred catalyst support, however, is a previously prepared linear alternating polymer of the same general type as that being prepared in the polymerization process. By whatever embodiment, sufficient catalyst is used to provide from about $1 \times 10^{-7}$ mol to about $1 \times 10^{-3}$ mol of palladium per mol of total ethylenically unsaturated hydrocarbon. Amounts of catalyst sufficient to provide from about $1 \times 10^{-6}$ mol to about $1 \times 10^{-4}$ mol of palladium per mol of total ethylenically unsaturated hydrocarbon are preferred.

The polymerization is conducted by contacting the carbon monoxide and ethylenically unsaturated hydrocarbon reactants in the gas phase in the substantial absence of liquid reaction diluent in the presence of the catalyst composition under polymerization conditions. The molar ratio of carbon monoxide to total ethylenically unsaturated hydrocarbon is usefully from about 10:1 to about 1:10 but preferably is from about 5:1 to about 1:5. Polymerization conditions typically include a reaction temperature from about 25° C. to about 150° C., preferably from about 30° C. to about 130° C. The polymerization pressure is from about 2 bar to about 150 bar, but pressures from about 5 bar to about 100 bar are more frequently employed. On occasion, it is helpful to provide to the reaction mixture a small amount of hydrogen or lower alkanol, e.g., methanol or ethanol. The addition of such materials is thought to improve the activity of the catalyst.

The polymerization process is conducted in a batchwise manner or is conducted continuously or semi-continuously. The polymer product is useful as recovered or is purified as by contact with a solvent or complexing agent selective for catalyst residues. If desired, the polymer is separated from any catalyst support as by dissolving the polymer in a selective solvent such as m-cresol or hexafluoroisopropanol. When the preferred linear alternating polymer catalyst support is employed, however, it is generally unnecessary to separate the polymer product form the structurally similar support.

The polyketone polymers are thermoplastic materials of relatively high melting point and are useful in the utilities normally associated with conventional thermoplastics but additionally are useful as engineering thermoplastics. They are processed by methods which are conventional for thermoplastics, e.g., extrusion, injection molding and thermoforming, into a variety of shaped articles of established utility. Specific applications include containers for food and drink and parts and housings for automotive applications.

The invention is further illustrated by the following Comparative Experiments (not of the invention) and the Illustrative Embodiments which should not be regarded as limiting. In all cases when substantial polymer was formed, the polymer was examined by $^{13}$C-NMR and found to be linear in structure with units derived from carbon monoxide alternating with units derived from ethylene.

ILLUSTRATIVE EMBODIMENT I

A carbon monoxide/ethylene copolymer was produced by absorbing on 8g of a linear alternating copolymer of carbon monoxide and ethylene a catalyst solution containing 1.5 ml methanol, 0.5 ml tetrahydrofuran, 0.0095 mmol palladium acetate, 0.028 mmol boron trifluoride diethyl ether etherate, and 0.0104 mmol 1,3-bis[di(2-methoxyphenyl)phosphino]propane. This supported catalyst was charged to an autoclave of 300 ml capacity equipped with a mechanical stirrer. After the air in the autoclave was removed by evacuation, the autoclave and contents were heated to 85° C. and an equimolar mixture of carbon monoxide and ethylene was introduced until a pressure of 50 bar was reached and hydrogen was added until a total pressure of 55 bar was obtained. During the resulting polymerization, the pressure was maintained at 55 bar by the addition of supplemental equimolar mixture. After 10 hours, the polymerization was terminated by cooling the reaction mixture to ambient temperature and releasing the pressure.

The yield of copolymer was 89.4 g, obtained at a rate of 7.9 kg of copolymer/g Pd hr.

ILLUSTRATIVE EMBODIMENT II

A copolymer of carbon monoxide and ethylene was obtained by a procedure substantially similar to that of Illustrative Embodiment I except that the catalyst solution contained 0.024 mmol antimony pentafluoride instead of the boron trifluoride etherate and the reaction time was 4 hours instead of 10 hours.

The yield of copolymer was 32.6 g, obtained at a rate of 6.1 kg of copolymer/g Pd hr.

ILLUSTRATIVE EMBODIMENT III

A carbon monoxide/ethylene copolymer was obtained by a procedure substantially similar to that of Illustrative Embodiment I except that the catalyst solution contained 0.028 mmol aluminum trifluoride instead of the boron trifluoride etherate and the reaction time was 4.4 hours instead of 10 hours.

The yield of copolymer was 20.4 g, obtained at a rate of 2.8 kg of copolymer/g Pd hr.

ILLUSTRATIVE EMBODIMENT IV

A carbon monoxide/ethylene copolymer was produced by a procedure substantially similar to that of Illustrative Embodiment I except that the catalyst solution contained 0.19 mmol of boron trifluoride diethyl ether etherate instead of 0.028 mmol and the reaction time was 4.2 hours instead of 10 hours.

The yield of copolymer was 20.3 g, obtained at a rate of 2.9 kg of copolymer/g Pd hr.

COMPARATIVE EXPERIMENT I

A copolymer of carbon monoxide and ethylene was produced by a procedure substantially similar to that of Illustrative Embodiment I except that the catalyst solution contained 0.028 mmol trifluoromethanesulfonic acid instead of the boron trifluoride etherate and the reaction time was 5 hours instead of 10 hours.

The yield of copolymer was 15.6 g, obtained at a rate of 1.5 kg of copolymer/g Pd hr.

COMPARATIVE EXPERIMENT II

A carbon monoxide/ethylene copolymer was produced by a procedure substantially similar to that of Illustrative Embodiment I except that the catalyst solution contained 0.19 mmol trifluoromethanesulfonic acid instead of the boron-trifluoride-etherate and the reaction time was 4.8 hours instead of 10 hours.

The yield of copolymer was 10.9 g, produced at a rate of 0.6 kg of copolymer/g Pd hr.

COMPARATIVE EXPERIMENT III

A carbon monoxide/ethylene copolymer was produced by a procedure substantially similar to that of Illustrative Embodiment I except that the catalyst solution contained 0.024 mmol p-toluenesulfonic acid instead of the boron trifluoride etherate and the reaction time was 4.6 hours instead of 10 hours.

The yield of copolymer was 16.8 g, obtained at the rate of 1.9 kg of copolymer/g Pd hr.

COMPARATIVE EXPERIMENT IV

A copolymer of carbon monoxide and ethylene was obtained by a procedure substantially similar to that of Illustrative Embodiment I except that the catalyst solution contained 0.19 mmol p-toluenesulfonic acid instead of the boron trifluoride etherate and the reaction time was 4.6 hours instead of 10 hours.

The yield of copolymer was 8.3 g, obtained at a rate of 0.1 kg of copolymer/g Pd hr.

What is claimed is:

1. A catalyst composition useful in the gas-phase production of linear alternating polymers of carbon monoxide and at least one ethylenically unsaturated hydrocarbon comprising (a) a compound of palladium, (b) a Lewis acid of the formula $MF_n$ wherein n is 3 or 5 and M is a Group III or V element which forms a binary fluoride, said Lewis acid present in an amount of from about 0.5 to 200 mols per mol of palladium compound, and (c) a bidentate ligand of:

(i) sulfur represented by the formula

wherein R independently is aliphatic or aromatic of up to 10 carbons inclusive and $R^1$ is a divalent hydrocarbyl linking group of up to 10 carbon atoms inclusive with from 2 to 4 carbon atoms inclusive in the bridge, (ii) nitrogen represented by the formula

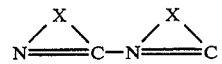

wherein X individually is a divalent linking group of up to 10 carbon atoms with from 3 to 4 atoms in the bridge, at least two of which are carbon atoms, or (iii) of phosphorus represented by the formula

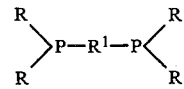

wherein R and R' have the previously stated meanings, said ligand present in an amount from about 0.5 to 100 mols per mol of palladium.

2. The catalyst composition of claim 1 wherein the compound of palladium is a palladium carboxylate.

3. The catalyst composition of claim 1 wherein n is 3.

4. The catalyst composition of claim 3 wherein R' is 1,3-propylene.

5. The catalyst composition of claim 1 wherein the bidentate ligand is 1,3-bis[di(2-methoxyphenyl)phosphino]propane.

6. The catalyst composition of claim 1 wherein R is aromatic with at least one alkoxy group substituted on a ring carbon atom ortho to the carbon atom through which the R group is connected to the phosphorus.

7. The catalyst composition of claim 6 wherein the bidentate ligand is 1,3-bis[di(2-methoxyphenyl)phosphino]propane.

8. The catalyst composition of claim 7 wherein the Lewis acid is aluminum trifluoride.

9. The catalyst composition of claim 7 wherein the Lewis acid is boron trifluoride.

10. The catalyst composition of claim 9 wherein the boron trifluoride is provided as the diethyl ether etherate.

* * * * *